3 Sheets—Sheet 1.

D. WILLIAMSON.
Grain-Binder.

No. 217,185. Patented July 1, 1879.

3 Sheets—Sheet 3.

D. WILLIAMSON.
Grain-Binder.

No. 217,185. Patented July 1, 1879.

WITNESSES: Chas. Niera, C. Sedgwick

INVENTOR: D. Williamson
BY Munn & Co.
ATTORNEYS.

UNITED STATES PATENT OFFICE.

DANIEL WILLIAMSON, OF SUNBURY, PENNSYLVANIA.

IMPROVEMENT IN GRAIN-BINDERS.

Specification forming part of Letters Patent No. 217,185, dated July 1, 1879; application filed March 27, 1879.

*To all whom it may concern:*

Be it known that I, DANIEL WILLIAMSON, of Sunbury, in the county of Northumberland and State of Pennsylvania, have invented a new and useful Improvement in Grain-Binders, of which the following is a specification.

Figure 1:
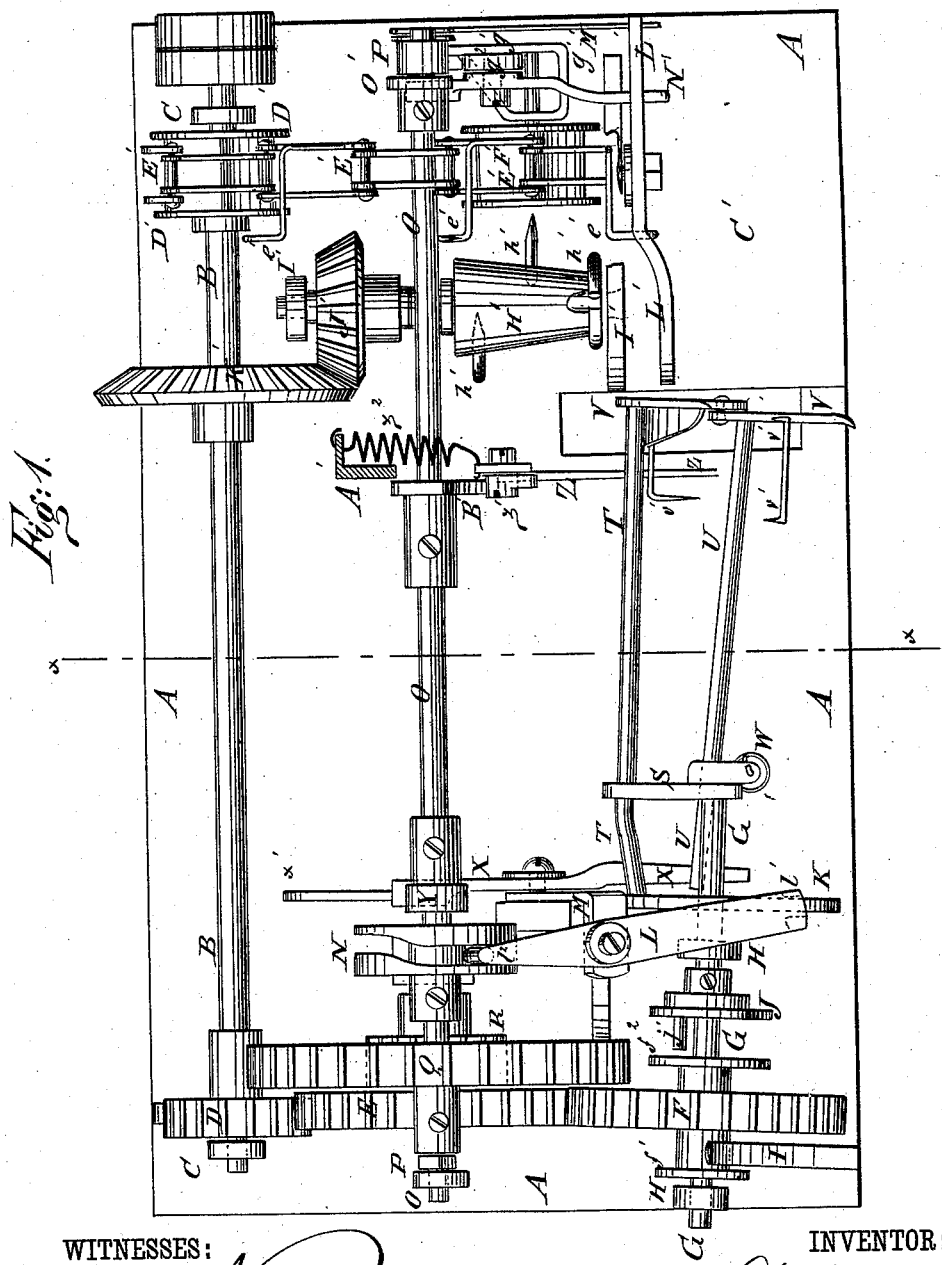
Figure 2:
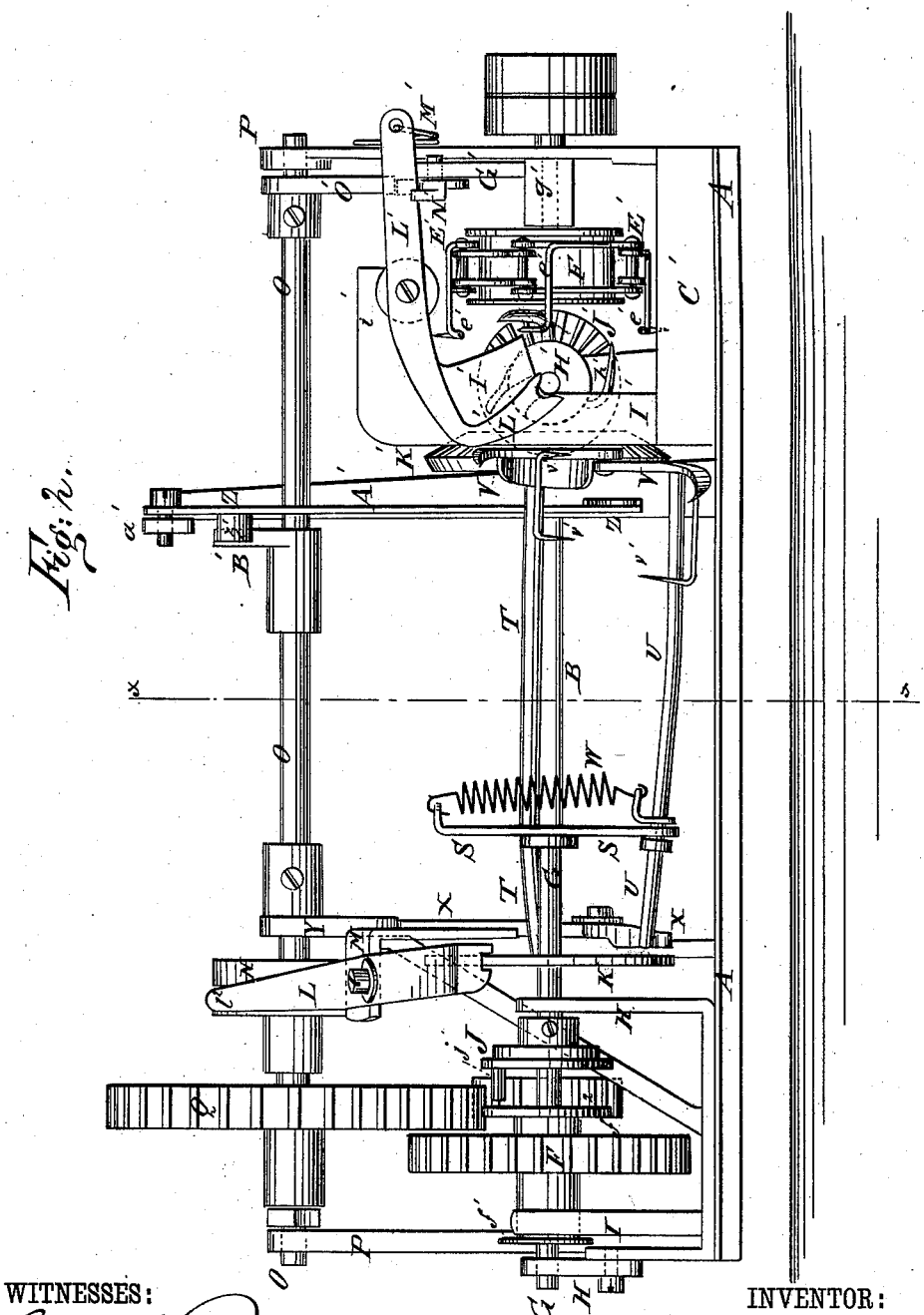
Figure 3:
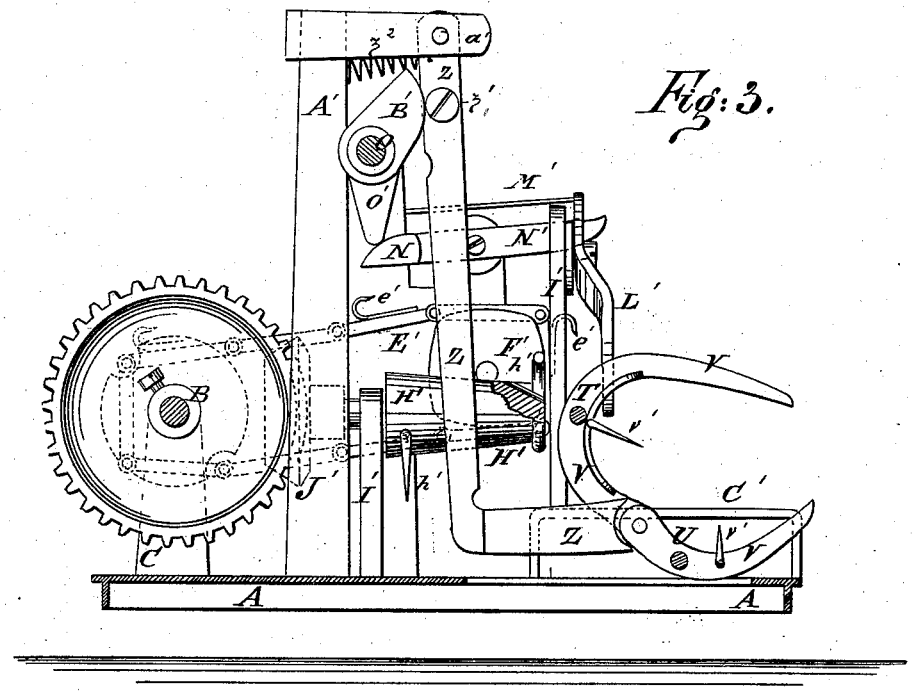
Figure 4:
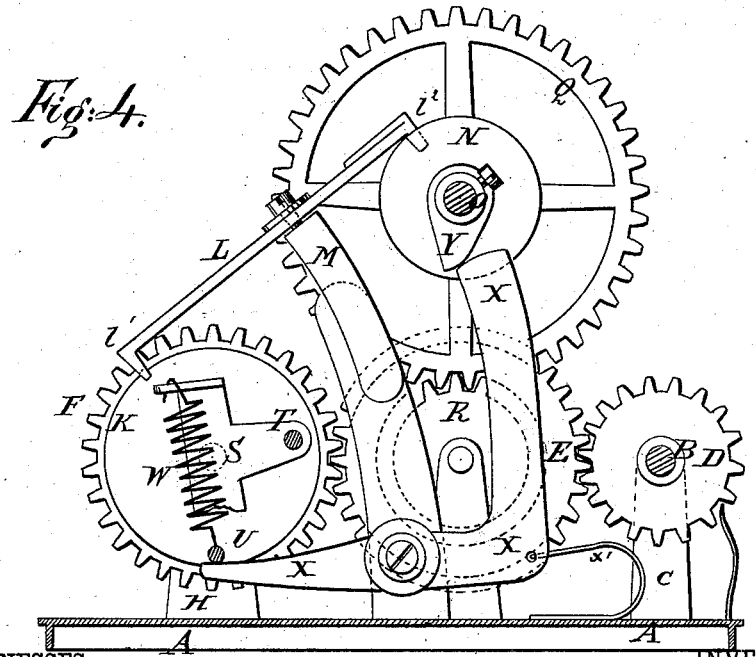

Figure 1, Sheet 1, is a top view of my improved device. Fig. 2, Sheet 2, is a front view of the same. Fig. 3, Sheet 3, is a vertical section of the same, taken through the line $x\,x$, Figs. 1 and 2, and looking to the right. Fig. 4, Sheet 3, is a vertical section of the same, taken through the line $x\,x$, Figs. 1 and 2, and looking to the left.

The object of this invention is to furnish an improved device for attachment to reapers for binding the cut grain into bundles as the gavels are raked from the reaper-platform, which shall be so constructed as to receive the gavels, bind them with their own straw, and drop them from the machine, and which shall be simple in construction and reliable in use.

The invention consists in the combination of the three-armed plate, the rigid bar, the pivoted bar, the arms hinged to each other and provided with points, the spring, the clutch, the disk, the lever, and the grooved cam with each other, and with the three shafts and the five gear-wheels, for grasping and rotating the gavel; in the combination of the chain-wheels, the endless chain provided with hooks, the cylinder provided with hooks, and the bevel-gear wheels with each other, and with the driving-shaft, for taking the straw, twisting it and passing it around the gavel; in the combination of the bent lever, the spring, and the cam with the shaft, and with the pivoted bar of the gavel-clamp, for opening the said clamp at the proper time.

Similar letters of reference indicate corresponding parts.

A represents the bed-plate of the device. B is the driving-shaft, which revolves in bearings in short standards C, attached to the rear part of the bed-plate A. The shaft B is driven from the driving mechanism of the reaper by an endless chain or other suitable means.

To the shaft B, near one end, is attached a small gear-wheel, D, the teeth of which mesh into the teeth of a larger gear-wheel, E. The journals of the gear-wheel E revolve in bearings attached to the bed-plate A, and its teeth mesh into the teeth of the gear-wheel F, which revolves upon the shaft G. The shaft G revolves and slides in bearings in standards H, attached to the bed-plate A.

I is a spring attached to the bed-plate A, and it rests upon the hub of the gear-wheel F, and against a flange, $f^1$, formed upon the end of the said hub to hold the gear-wheel F from being moved laterally by the longitudinal movement of its shaft G.

To the shaft G, at the inner end of the hub of the gear-wheel F, is attached a small wheel, J, which is provided with a laterally-projecting pin, $j'$, which enters a notch in the flange $f^2$, formed upon the inner end of the hub of the gear-wheel F, to cause the said gear-wheel F to carry the shaft G with it in its revolution.

To the shaft G is attached a disk, K, upon the edge of which rides the fork $l^1$, formed upon or attached to the end of a lever, L. The lever L is pivoted to a standard, M, attached to the bed-plate A, and attached to or formed upon its other end is a pin, $l^2$, which enters a cam-groove formed in the wheel N, attached to the shaft O.

The shaft O is placed parallel with the shaft B, revolves in bearings in the standards P, and to it is attached a large gear-wheel, Q, the teeth of which mesh into the teeth of the small gear-wheel R, attached to the gear-wheel E, or to the journal of the said gear-wheel E.

The various gear-wheels are so formed that the gear-wheel F will make three revolutions while the gear-wheel Q makes one, and the cam-groove in the wheel N is so formed as to shift the clutch J at such times that the gear-wheel F will carry the shaft G with it for two revolutions, and allow the said shaft G to stand still for one revolution.

To the end of the shaft G is attached a three-armed plate, S, one of the arms of which projects at right angles to the other two.

To the end of the middle arm of the plate S is attached a bar, T, one end of which is attached to the disk K, so that the said bar will be held in place firmly. To the end of another arm of the plate S is pivoted a bar, U, the outer end of which enters nearly to the disk K.

To the inner ends of the bars T U are attached two semicircular arms, V, which are hinged to each other at one end, and are provided with points $v'$, to take hold of a gavel and rotate it as the shaft G is rotated. The pivoted bar U is held up, holding the free ends of the semicircular arms V pressed toward each other to grasp the gavel by a spiral spring, W, one end of which is attached to the said bar at the inner side of the plate S, and the other end of which is attached to the end of the third arm of the said three-armed plate S. The outer end of the pivoted bar U is raised to open the arms V to release the bound bundles and receive the gavels by the upward movement of the lower arm of the bent lever X, which is pivoted near the rear end of its lower arm to the lower part of the standard M.

The upper arm of the bent lever X projects into such a position that it may be struck and operated by the cam Y attached to the shaft O. The cam Y is so formed and arranged as to operate the lever X to raise the bar U and open the arms V just as the shaft G is thrown out of gear with the gear-wheel F, and hold the said arms V open while the said gear-wheel F makes one revolution. The lever X is held away from the pivoted bar U by a spring, $x'$, attached to the bed-plate A, and connected with the said lever X at its angle. As the arms V open the bundle is pushed out by the forked end of the lower arm of the bent lever Z, which is pivoted at the end of its upper arm to an arm, $a'$, formed upon or rigidly attached to the upper end of the standard A'.

The lever Z is moved forward to push the bound bundles from the arms V by a cam, B', attached to the shaft O, which strikes against a pin or projection, $z^1$, attached to or formed upon the side of the upper arm of the said lever Z. The lever Z is drawn back when released from the cam B' by a spring, $z^2$, attached to it and to the standard A'. As the bound bundle is pushed out by the lever Z another gavel is deposited upon the table C', with its end projecting between the arms V, so as to be grasped by them as they are closed together, and revolve twice as the shaft G makes its two revolutions.

To the shaft B is attached a square chain-wheel, D', around which passes an endless chain, E'. The chain E' also passes around a square chain-wheel, F', pivoted to an arm, $g'$, attached to or formed upon the standard P attached to the bed-plate A.

From the inner side of the endless chain E' project hooks $e'$, which, as the said chain E' is carried along by its chain-wheels, take straw from the gavel and draw it inward. As the straw is drawn inward it is taken from the hooks $e'$ of the chain E' by the hooks $h'$ attached to the cylinder H', is drawn into the notch formed in the forward end of the said cylinder H', is twisted by the revolution of the said cylinder, and is wound around the gavel as the said gavel is revolved by the arms V. The cylinder H is pivoted to the standards I' attached to the bed-plate A. To the rear end of the cylinder H' is attached a bevel-gear wheel, J', the teeth of which mesh into the teeth of the bevel-gear wheel K', attached to the shaft B.

As the gavel completes its second revolution the free end of the twisted straw is pushed beneath the straw band passing around the said gavel by the forked end of the bent lever L'. The bent lever L' is pivoted to an arm, $i'$, formed upon or attached to the standard I', and with its outer end is connected the end of a spring, M', attached to the standard P. The bent lever L' is operated to tuck the band by a lever, N', the forward end of which rests beneath the outer end of the said bent lever L'.

The lever N' is pivoted to an arm, $g^2$, formed upon or attached to the arm $g^1$ of the standard P, and its rear end projects into such a position as to be struck and operated at the proper time by the cam O' attached to the shaft O.

With this construction, as each gavel is deposited upon the table C', its end is grasped by the arms V and it is carried through two revolutions. At the same time straw is taken from the gavel by the hooked chain E', twisted by the hooked cylinder H', wound around the gavel by the revolution of the said gavel, and is tucked by the bent lever L'. The bound bundle is then pushed from the machine by the bent lever Z.

Having thus fully described my invention, I claim as new and desire to secure by Letters Patent—

1. The combination of three-armed plate S, the rigid bar T, the pivoted bar U, the curved arms V, hinged to each other and provided with the points $v'$, the spring W, the clutch J $j'$, the disk K, the lever L, and the grooved cam N with each other, and with the three shafts B G O and the five gear-wheels D E F Q R, for grasping and rotating the gavel, substantially as herein shown and described.

2. The combination of the chain-wheels D' F', the endless chain E', provided with the hooks $e'$, the cylinder H', provided with the hooks $h'$, and the bevel-gear wheels J' K', with each other, and with the driving-shaft A, for taking the straw, twisting it, and passing it around the gavel.

3. The combination of the bent lever X, the spring $x'$, and the cam Y with the shaft O, and with the pivoted bar U of the gavel-clamp, for opening the said clamp at the proper time, substantially as herein shown and described.

4. The combination, with arms V and table C', of the hook-chain E' $e'$, hooked cylinder H' $h'$, and the bent lever L', as and for the purpose specified.

DANIEL WILLIAMSON.

Witnesses:
 ALEXANDER YEAGER,
 MARX KUNTZMAN.